United States Patent
van den Boom et al.

(10) Patent No.: US 10,768,060 B2
(45) Date of Patent: Sep. 8, 2020

(54) OPTICAL WAVEGUIDE SYSTEM FOR 2-DIMENSIONAL LOCATION SENSING

(71) Applicant: Technische Universiteit Eindhoven, Eindhoven (NL)

(72) Inventors: Henricus Petrus Anna van den Boom, Oisterwijk (NL); Antonius Marcellus Jozef Koonen, Nuenen (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 16/080,006

(22) PCT Filed: Feb. 24, 2017

(86) PCT No.: PCT/EP2017/054353
§ 371 (c)(1),
(2) Date: Aug. 25, 2018

(87) PCT Pub. No.: WO2017/144675
PCT Pub. Date: Aug. 31, 2017

(65) Prior Publication Data
US 2019/0064012 A1 Feb. 28, 2019

Related U.S. Application Data

(60) Provisional application No. 62/300,153, filed on Feb. 26, 2016.

(51) Int. Cl.
*G01L 1/24* (2006.01)
*G01L 5/22* (2006.01)
(Continued)

(52) U.S. Cl.
CPC .............. *G01L 1/243* (2013.01); *G01L 1/247* (2013.01); *G01L 5/228* (2013.01); *G02F 1/13338* (2013.01); *G06F 3/0421* (2013.01)

(58) Field of Classification Search
CPC ......... G01L 1/243; G01L 1/247; G01L 5/228; G02F 1/13338; G06F 3/0421
(Continued)

(56) References Cited

U.S. PATENT DOCUMENTS

| 4,733,068 A | 3/1988 | Thiele et al. |
| 2005/0103988 A1* | 5/2005 | Wang .................... G01L 1/243 250/227.14 |

(Continued)

FOREIGN PATENT DOCUMENTS

| EP | 0089237 | 9/1983 | |
| GB | 2141821 A * | 1/1985 | ............. G01L 1/247 |

OTHER PUBLICATIONS

Missinne et al., "Artificial skin based on flexible optical tactile sensors", 2010, SPIE Newsroom.
(Continued)

*Primary Examiner* — Jerry M Blevins
(74) *Attorney, Agent, or Firm* — Lumen Patent Firm (57) ABSTRACT

Pressure sensing having 2-D resolution is provided by an array of optical waveguides having wave-guide intersections (e.g., intersecting rows and columns). Pressure induced cross-coupling between intersecting wave-guides is enhanced by including mechanical structures at each intersection that enhance local waveguide bending. For example, such structures can be rigid rings around the wave-guide intersections.

9 Claims, 6 Drawing Sheets

(51) Int. Cl.
*G06F 3/042* (2006.01)
*G02F 1/1333* (2006.01)

(58) Field of Classification Search
USPC .......................................................... 385/12
See application file for complete search history.

(56) References Cited

U.S. PATENT DOCUMENTS

| 2007/0098323 | A1* | 5/2007 | Pi ....................... G01K 11/3206 |
| | | | 385/30 |
| 2008/0234898 | A1* | 9/2008 | Wiener .................. G01G 3/125 |
| | | | 701/45 |
| 2014/0098058 | A1* | 4/2014 | Baharav ................ G06F 3/0421 |
| | | | 345/174 |

OTHER PUBLICATIONS

Rothmaier et al., "Textile pressure sensor made of flexible plastic optical fibers", 2008, Sensors v8 pp. 4318-4329.
Wang et al., "A shear and plantar pressure sensor based on fiber-optic bend loss", 2005, JRRD v42n3, pp. 315-326.

\* cited by examiner

OPTICAL WAVEGUIDE SYSTEM FOR 2-DIMENSIONAL LOCATION SENSING

CROSS-REFERENCE TO RELATED APPLICATIONS

This application is a 371 of PCT application PCT/EP2017/054353 filed Feb. 24, 2017. PCT application PCT/EP2017/054353 claims the benefit of U.S. Provisional application 62/300,153 filed Feb. 26, 2016.

FIELD OF THE INVENTION

This invention relates to pressure sensing providing 2-D location information.

BACKGROUND

Position sensing is a key function needed for monitoring the movements of objects and/or persons. Preferably it is to be done without affixing any wires to those objects/persons, in order not to hamper these in their movements. In particular in observing the behavior of persons, it is desired that this sensing function remains unobtrusive.

One proposed method for doing this relies on pressure sensing using optical fibers as the sensor. In one example (Rothmaier et al., *Sensors* v8, pp4318-4329, 2008), a textile including flexible optical fibers is used as such a sensor, where the loss of transmitted light from a fiber under pressure is the physical effect being exploited. However, this approach does not provide full position resolution, because it is not possible to determine from a drop in transmitted intensity where along the fiber the corresponding pressure (or pressures) occurred.

Accordingly, it would be an advance in the art to provide pressure sensing using optical waveguides having full 2-D position resolution.

SUMMARY

In one aspect, this work provides a position-sensing method which does not require any physical connections to the objects/persons. It is based on sensing local pressures exerted by them on a surface using a 2-dimensional optical waveguide structure. Within this structure, the light propagation is changed by these pressures, and by measuring these changes in correlation to the position in the structure, the 2-dimensional localization is done. E.g., by putting this structure inside or beneath a mattress, the 2-dimensional movements of a person during his sleep can be monitored while he does not experience any effects from the sensing system which may have impact on his sleep behavior. Note also that the measurements are taken by changes in the optical propagation characteristics of the structure, not by electrical fields. Thus these measurements are not influenced by any disturbing electromagnetic fields (coming e.g. from local Wi-Fi systems, or from electrical power lines), nor are they generating electromagnetic fields themselves which e.g. could interfere with medical monitoring equipment or with devices inside/near the person (such as heart pace makers).

Bending optical waveguide can introduce losses because of light that escapes. The light that escapes can be captured in a crossing waveguide. So bending crossing optical waveguides, when pressure or force is exerted, can result in optical coupling between the two crossing waveguides, which is roughly proportional to this exerted pressure or force. For example, a simple ring at a waveguide crossing can realize this bending of the waveguide(s). This construction is easy to produce, because the waveguide cladding can be left intact and alignment is not critical. The crossing is still very robust. Other constructions which realize bending at waveguide crossings may also be possible.

This sensing method is robust, flexible and waterproof because of the use of Plastic Optical Fiber (POF) in preferred embodiments, is readily scalable because N detectors plus M sources create N×M sensor points, is not affected by external electrical fields, nor does it generate any electrical fields itself, and is thin (e.g., only 3 mm thick in one example) so it can easily be put under e.g. a mattress. The method is low-cost because readily available optical and electrical components can be used like LEDs for lighting and silicon photodiodes, and only low frequency electrical components are needed.

Many application fields are foreseen. Applications include but are not limited to: 1) Position monitoring of persons during their sleep without causing any disturbances to them; and 2) monitoring trips/falls with an under-carpet sensor installation (or one that is woven into the carpet). This can detect walking and falling of elderly persons, which is more privacy-friendly than using video cameras.

DETAILED DESCRIPTION

Figure 1:
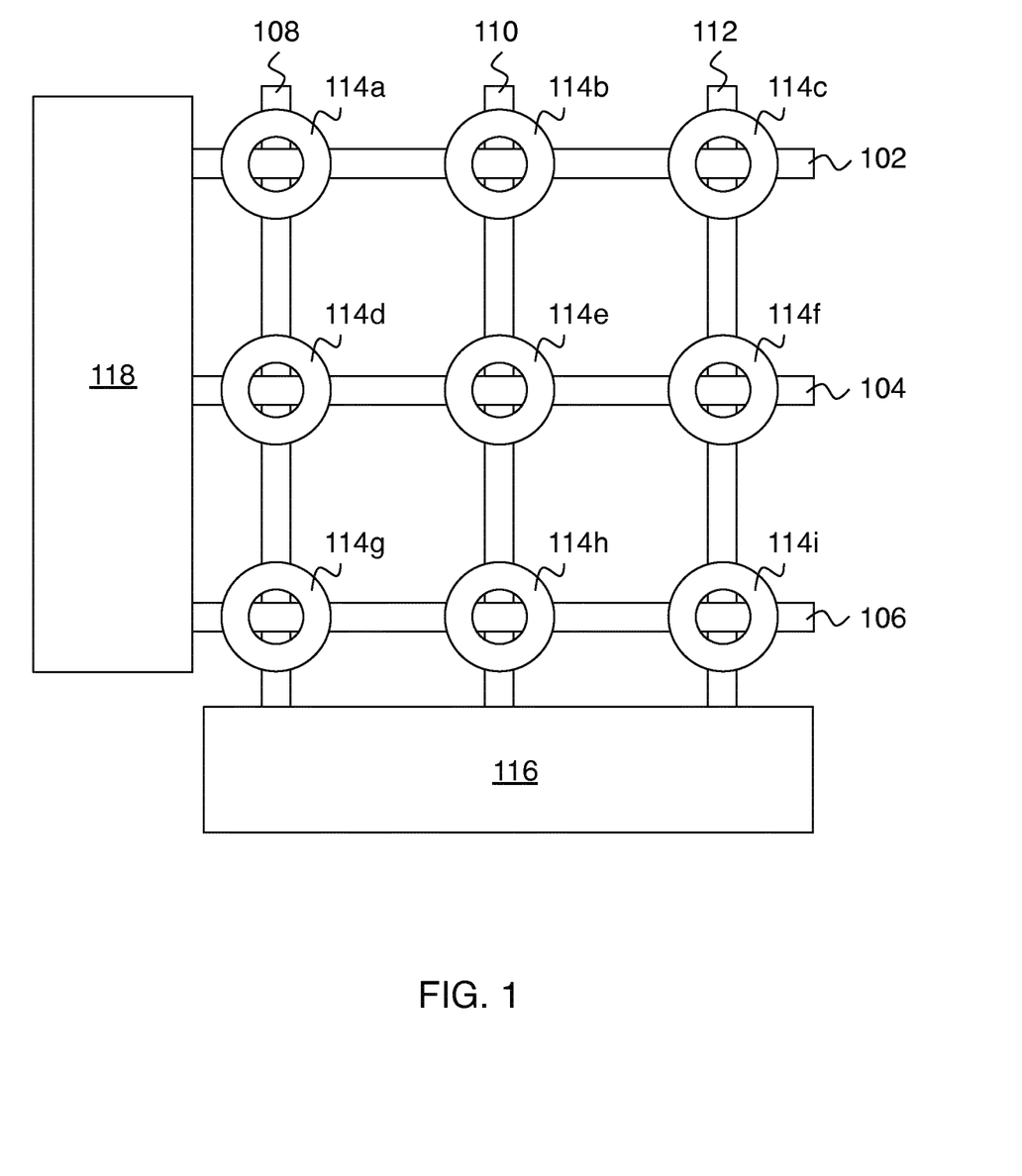
FIG. 1 shows an exemplary embodiment of the invention.

FIG. 1 shows an exemplary embodiment of the invention. In this example, two or more row optical waveguides 102, 104, and 106 and two or more column optical waveguide 108, 110, and 112 are arranged in a planar array to define crossing sensors. Each crossing sensor includes one of the row waveguides in contact with one of the column waveguides at an intersection point. Each crossing sensor further includes a mechanical structure configured to enhance waveguide bending when pressure is applied to the crossing sensor. In the example of FIG. 1, these mechanical structures are rigid rings 114a, 114b, 114c, 114d, 114e, 114f, 114g, 114h, and 114i. Rings are shown for illustrative purposes, but any other mechanical structure that increases waveguide bending when the crossing sensor is subject to pressure can also be used. The optical waveguide pressure sensor array this provides is configured to sense pressure by providing light to the row optical waveguides with source electronics 118 and measuring light coupled to the column optical waveguides with detection electronics 116, or vice versa.

In cases where the mechanical structure includes rigid rings, it is preferred for the holes of the rings to laterally enclose the intersection points of the crossing sensor, as shown on FIG. 1.

Practice of the invention does not depend critically on the kind of waveguides used for the row and column optical waveguides. Suitable waveguides include, but are not limited to: step-index plastic fibers and graded-index plastic fibers.

The optical coupling between the waveguides at the crossing sensors is a function of the local pressure, so by detecting the optical power received, the pressure on a crossing sensor can be measured. Because the optical coupling effect between transmitting and receiving waveguide is very small, high-sensitivity optical receivers are needed, using transimpedance amplifiers with high gain and a high input impedance. Sensitivity can be increased further by modulating each optical source with a low frequency carrier and applying highly-selective synchronous or lock-in detection, executed by multiplying the received amplified signal with the same carrier signal driving the LEDs and low-pass filtering the output. To achieve a simple and scalable system, a crossing sensor scanning method is preferred. Source electronics 118 selects only one row at a time to illuminate, and the crossings are scanned column by column by detection electronics 116. In this way, each crossing sensor is individually resolved and the combined results can provide a full 2-D pressure map.

A more specific example of a preferred electronics configuration follows. A local oscillator generates an electrical signal (e.g. a square wave) at a frequency $f_0$, with which an array of M optical sources (e.g. LEDs) is modulated. By means of a 1:P frequency divider, a counter and a line selector, this signal with frequency $f_0$ is fed to only one LED at a time, and each LED of the array is activated periodically (with a time period $M \times P/f_0$). These LEDs each feed a transmission waveguide running along the cross-points in a column of the matrix. At the receiving side of the 2-dimensional sensing module, the receiving waveguides, each running along a row of the matrix, each feed a photodetector (PD). The output signal of a PD is amplified, and then fed into a multiplier circuit where it is correlated with the signal from the local oscillator. By low-pass filtering and amplitude-detection, the received signal from that PD can be measured by analog detection with high selectivity and sensitivity. Optionally, when running the analog signal through a limiter device, also binary detection of the activated cross-points can be done. Joint processing of the (binary) row-outputs and the (binary or analog) column-outputs provides the (row, column) position sensing information.

Figure 2:
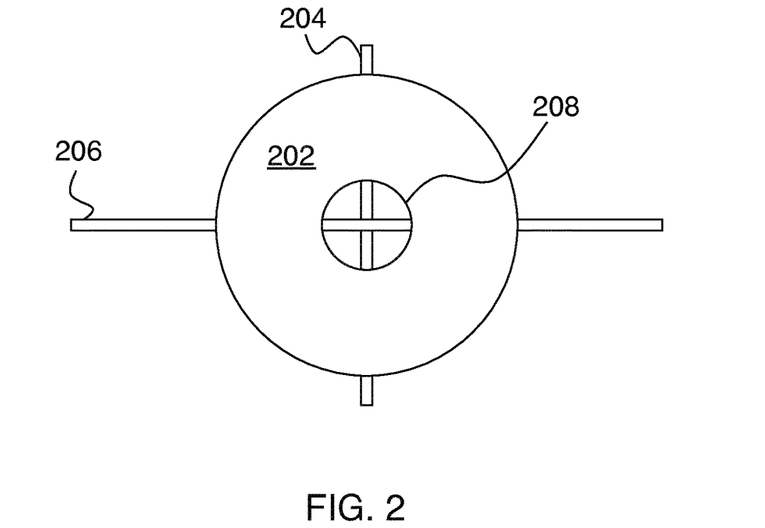
FIG. 2 is a top view of a crossing sensor having a ring to enhance waveguide bending under pressure.

FIG. 2 is a top view of a crossing sensor having a ring to enhance waveguide bending under pressure. Here 202 is a first rigid ring, 206 is the receiving optical waveguide and 204 is the transmitting optical waveguide. Alternatively, 206 can be the transmitting optical waveguide and 204 can be the receiving optical waveguide. The inside edge of the hole of ring 202 is referenced as 208. Although waveguides at an angle of 90 degrees to each other are shown on FIG. 2, other intersection angles are also usable.

Figure 3A:
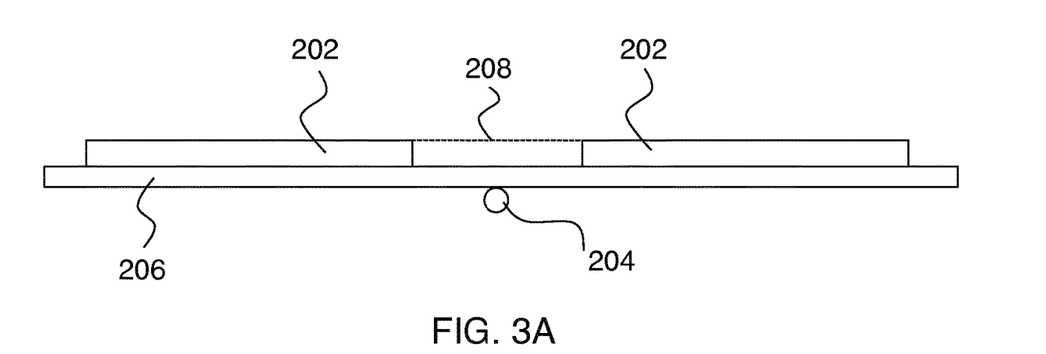
FIGS. 3A-B are side views showing operation of the crossing sensor of FIG. 2.
Figure 3B:
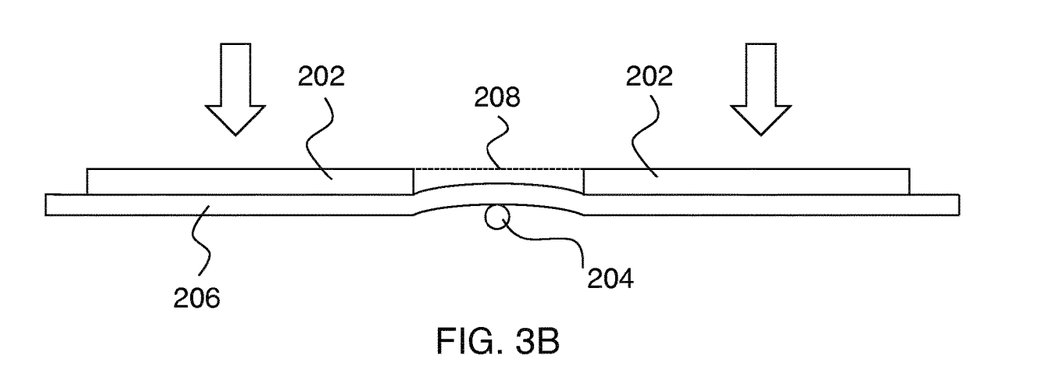

FIGS. 3A-B are side views showing operation of the crossing sensor of FIG. 2. FIG. 3A shows the configuration with no applied pressure. Here we see that application of pressure (block arrows on FIG. 3B) tends to cause waveguide bending as shown on FIG. 3B. The bending of the waveguide results in optical coupling at the waveguide crossing which is roughly proportional to the applied pressure. Bending the waveguide with a sufficiently small bend radius will slightly disrupt the confinement of the waveguide mode(s) (i.e., a small fraction of the light will leak through the cladding), and this is the physical effect relied upon here.

More specifically, the optical cross coupling is mainly due to bending of the transmitting and/or receiving waveguides. Bending enhances both light emitted from the transmitting waveguide and the ability of the receiving waveguide to couple incident light into its core.

Figure 4:
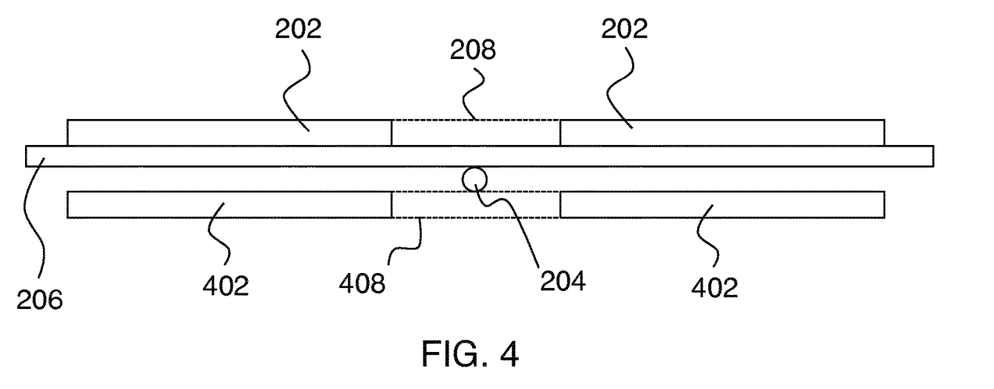
FIG. 4 shows a crossing sensor having two rigid rings sandwiching the waveguide intersection.

FIG. 4 shows a crossing sensor having two rigid rings sandwiching the waveguide intersection. Here a second rigid ring 402 having the inside edge of its hole referenced as 408 is disposed so that rings 302 and 402 sandwich the intersection point of the crossing sensor. Preferably the hole of the second rigid ring laterally encloses the intersection point of the crossing sensor. Preferably, the holes of the first and second rigid rings have substantially the same size and shape, and are also substantially laterally aligned, as schematically shown on FIG. 4. With this configuration, both waveguides have enhanced bending, thereby further increasing the cross-coupling.

Figure 5:
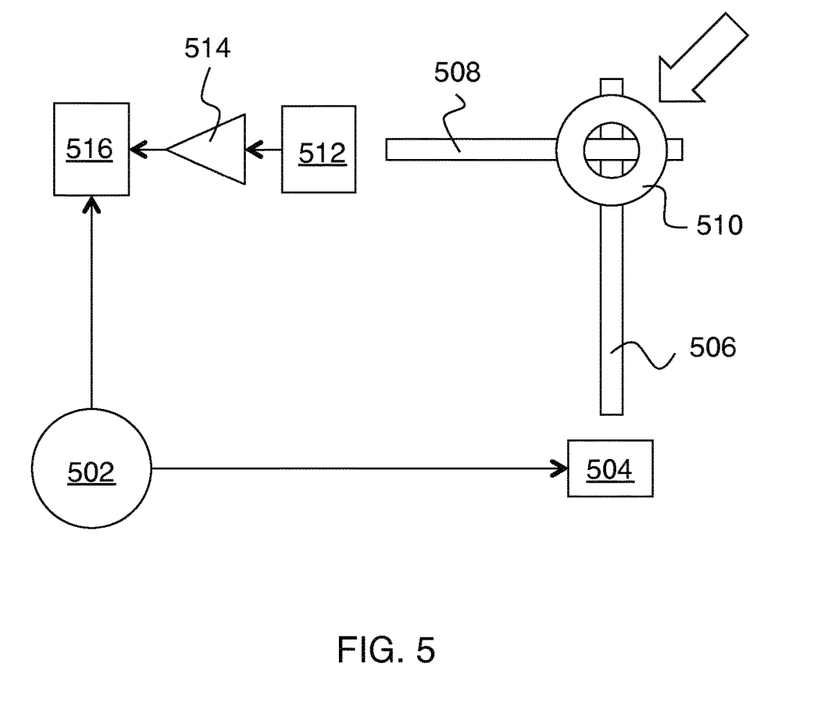
FIG. 5 shows an exemplary experimental setup for measuring waveguide cross coupling.

FIG. 5 shows an exemplary experimental setup for measuring waveguide cross coupling. Synchronous detection (also known as lock-in detection) is employed. Here 502 is the frequency reference, 504 is the optical source, 506 is the transmitting optical waveguide, 508 is the receiving optical waveguide, 510 (if present) is the mechanical structure for enhancing waveguide bending under pressure, 512 is the optical detector, 514 is a transimpedance amplifier and 516 is a lock-in amplifier.

In one experiment, waveguides 508 and 510 were standard PMMA (polymethylmethacrylate) step index POF (SI POF), with a fiber core diameter of 0.98 mm, fiber cladding diameter of 1.0 mm, and a Numerical Aperture of 0.5. Source 504 was a visible white light LED with an output power coupled into the SI-POF of about 3 mW. This light was modulated with a square wave signal with a frequency of 1000 Hz from frequency reference 502. Detector 512 was a silicon photodiode and 516 was an EG&G Brookdeal 5206 Lock-in amplifier, which performed the amplification and synchronous detection operations. The rings 510 had an outside diameter of 50 mm and an inside diameter of 8.5 mm.

Figure 6:
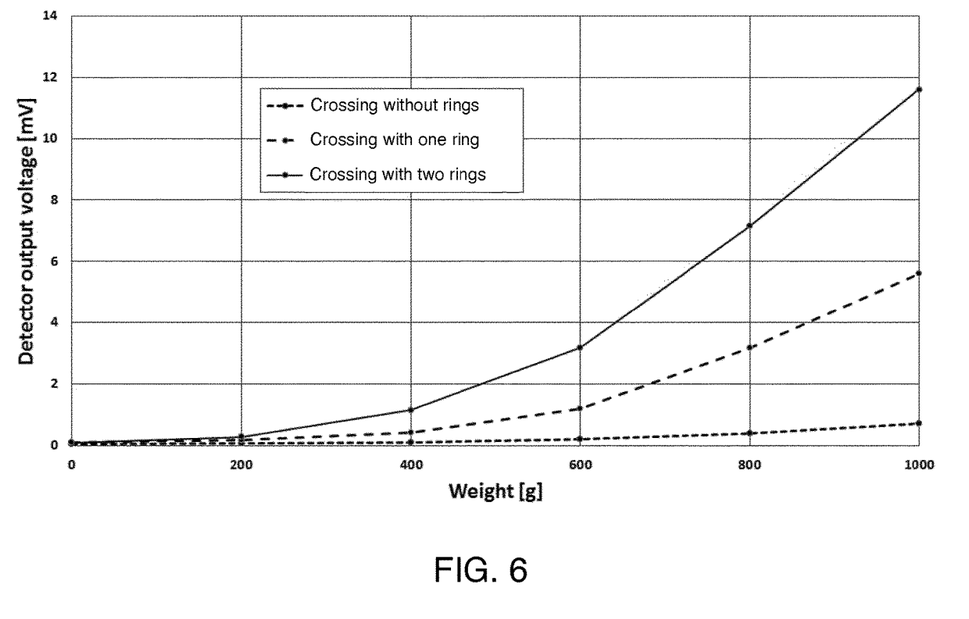
FIG. 6 shows experimental results from the arrangement of FIG. 5.

FIG. 6 shows the voltage of the lock-in amplifier vs. the weight exerted to a crossing with: two rings, one ring and no rings. These results clearly show the effect of fiber bending at fiber crossings as enhanced by the rings. It is also apparent that cross coupling is greatly reduced when no rings are present.

There are various specific options for the configuration of the waveguide crossings. These will be discussed by way of examples where the waveguides are optical fibers, but the principles involve are more generally applicable.

Figure 7A:
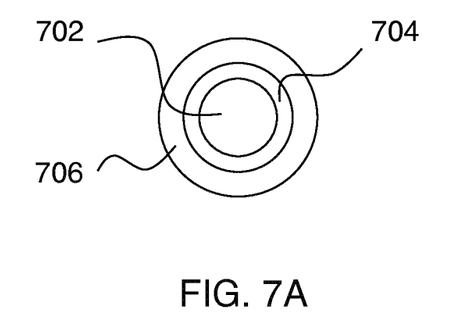
FIGS. 7A-D show views of several different options for the waveguide geometry at a crossing sensor.

FIG. 7A schematically shows a cross section of an optical fiber. Here 702 is the core, 704 is the cladding and 706 is the protective jacket. It is helpful to clearly understand the difference between cladding 704 and protective jacket 706, so we briefly review this distinction below.

A waveguide has a core surrounded by a cladding to provide propagation of light confined mainly to the core. Although light does extend into the part of the cladding nearest the core (i.e., the evanescent tail of the waveguide mode(s)), the cladding is thick enough that a negligible faction (i.e., exponentially small) of the light normally reaches the outer surface of the cladding. Because the waveguide mode extends into the cladding, the cladding should have low optical loss. Note that a conventional optical fiber will often have a 3-layer construction of core, cladding and protective jacket, as on FIG. 7A. The protective jacket, if present, is not part of the cladding, because no significant part of the waveguide mode(s) extends into the protective jacket. Accordingly, the optical properties of the protective jacket are irrelevant, and it need not have low optical loss.

Figure 7B:
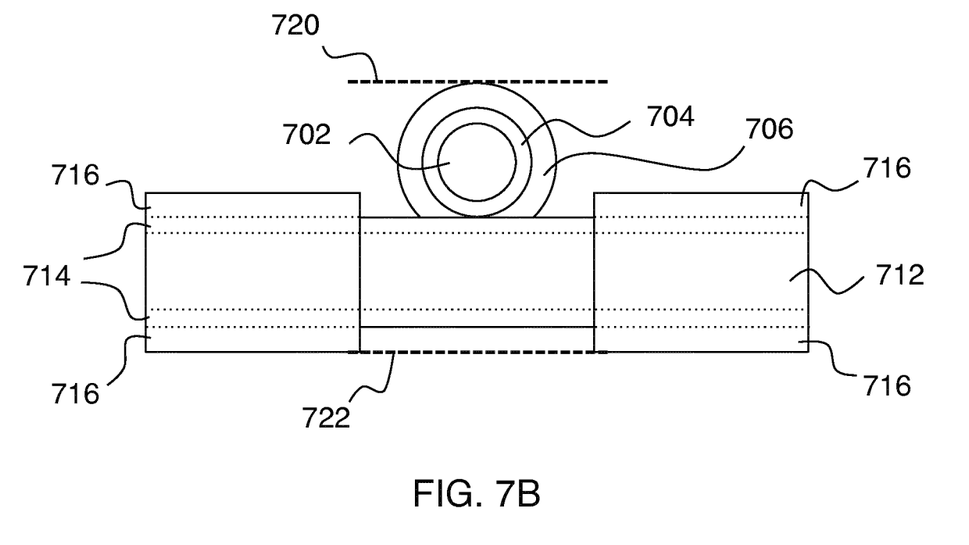

FIG. 7B shows a preferred configuration for a crossing sensor having fibers. Here the first fiber has core 702, cladding 704 and protective jacket 706. The second fiber has core 712, cladding 714 and protective jacket 716. Optionally, reflectors 720 and/or 722 (e.g., aluminum foil) can be present to enhance cross-coupling under pressure. The configuration of FIG. 7B has the protective jacket (706, 716) removed from both fibers at the crossing sensor. However, the cladding of both fibers (704, 714) is intact at the crossing sensor. This beneficially reduces the amount of work needed to fabricate a crossing sensor. More specifically, only the jacket needs to be removed. Nothing needs to be done to the cladding. One of the main points of this work is that sufficient waveguide cross-coupling can be obtained via waveguide bending even for waveguide crossings where the waveguide cladding is intact.

In earlier proof of concept work we found that sufficient waveguide cross-coupling was obtained using graded-index POF and a semiconductor laser source without the use of rings or other structures to enhance waveguide bending at crossings where the cladding was intact and the protective jacket was removed. However, it is expected that graded-index POF combined with enhanced waveguide bending will provide improved performance relative to this prior work.

In other prior proof of concept work, we found that step-index POF did not provide sufficient cross-coupling at waveguide crossings having intact cladding. Approaches were developed to increase cross-coupling in such cases, and these concepts were demonstrated in experiments using a light emitting diode (LED) as the source. Using an LED instead of a laser advantageously reduces cost. These approaches for increasing cross-coupling may lead to improved performance in combination with enhanced waveguide bending as described herein. Accordingly, they are described below in connection with FIGS. 7C and 7D. In experiments relating to this configuration, a weight of 100 g was detectable. This measured signal shows a clear reproducible and nearly linear relation to the weight pressure on the crossing sensor.

Figure 7C:
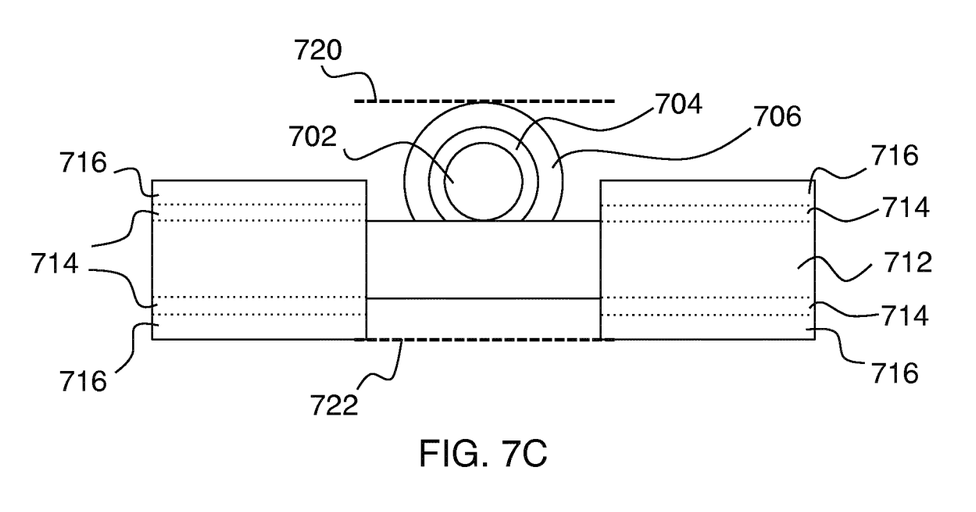

The configuration of FIG. 7C is similar to the configuration of FIG. 7B except that the cladding (704, 714) is removed from both fibers at the crossing sensor. Such removal of the cladding can be partial or complete (FIG. 7C shows complete removal). Such partial or complete removal of the cladding can increase the cross-coupling provided by the crossing sensor under pressure.

Figure 7D:
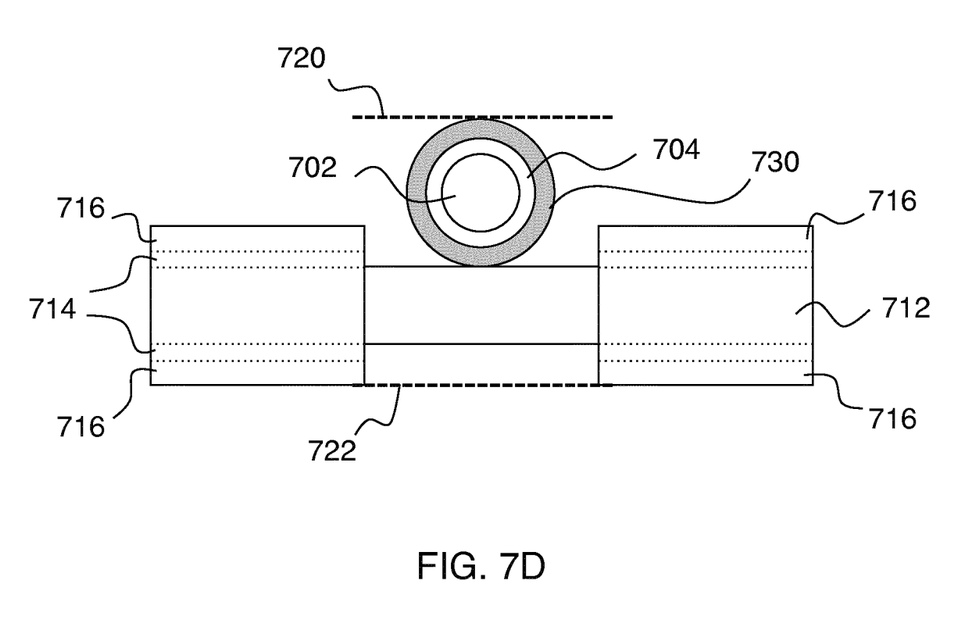

In the configuration of FIG. 7D, cladding 714 is removed at the crossing sensor, cladding 704 is intact at the crossing sensor, and cladding 704 is surrounded by a scatterer 730. Scatterer 730 serves to increase the fraction of light emitted from fiber core 712 (transmitting) that ends up in fiber core 702 (receiving).

In one example of the configuration of FIG. 7D, a small area of cladding 714 is removed so a small percentage (<0.1%) of the light in the core 712 can escape. Because of this small percentage, the optical power in the transmitting fiber is nearly constant over the whole length of the fiber (which is typically less than a few meters). At the crossing, the jacket or protective coating 706 of the receiving fiber is removed over a few centimeters and replaced by an elastic scattering non-absorbing primary coating 730. This is positioned such that the elastic scattering primary coating 730 of the receiving fiber can make physical contact to the core/cladding of the transmitting fiber at a fixed position. By applying pressure at the crossing some light of the transmitting fiber which is coupled in the elastic scattering primary coating 730 of the receiving fiber may then transition via the cladding 704 into the core 702 of the receiving fiber. In order to further enhance the coupling of light which has escaped from the transmission fiber into the receiving fiber, a reflective structure (such as a reflective aluminum foil) 720, 722 was added locally at the crossing sensor. Thus in a single crossing sensor which is only about 3 mm thick, some light gets from the transmitting fiber into the receiving fiber. The amount of this transitioning light depends upon the force exerted on the crossing sensor.

A proof-of-principle setup has been realized to measure a pressure profile of a person lying on a mattress using fiber crossings as in FIG. 7D. Scanning (i.e. the switching of the receiving fibers to a single photodiode) was done by hand. The sensor grid was 8 transmitting and 8 receiving SI-POFs with a Numerical Aperture of 0.3, so the grid had 64 crossings. The distance between the fibers is 9 cm so an area of about 70×70 cm is covered. To concentrate the local pressure, metal disks of 6×6 cm are fixed at the POF crossings. This grid is put under a foam mattress of 180× 80×16 cm and 2D pressure profiles have been measured in three situations—a person standing up on the mattress, lying on his back on the mattress, and lying on his right side. The measured pressure profiles clearly showed the position of the person on the mattress.

The invention claimed is:

1. An optical waveguide pressure sensor array comprising:
   two or more row optical waveguides;
   two or more column optical waveguides, wherein the row optical waveguides and the column optical waveguides are arranged in a planar array to define crossing sensors, wherein each crossing sensor includes one of the row waveguides in contact with one of the column waveguides at an intersection point;
   wherein each crossing sensor further includes a mechanical structure configured to enhance waveguide bending when pressure is applied to the crossing sensor;
   wherein the optical waveguide pressure sensor array is configured to sense pressure by providing light to the row optical waveguides and measuring light coupled to the column optical waveguides, or vice versa;
   wherein the mechanical structure includes a first rigid ring disposed in contact with one of the row or column optical waveguides;
   wherein a hole of the first rigid ring laterally encloses the intersection point of the crossing sensor.

2. The optical waveguide pressure sensor of claim 1, wherein the mechanical structure further includes a second rigid ring disposed such that the intersection point of the crossing sensor is vertically sandwiched between the first rigid ring and the second rigid ring;
   wherein a hole of the second rigid ring laterally encloses the intersection point of the crossing sensor.

3. The optical waveguide pressure sensor of claim 2, wherein the hole of the first rigid ring and the hole of the second rigid ring have substantially the same size and shape, and are substantially laterally aligned.

4. The optical waveguide pressure sensor of claim 1, wherein each row optical waveguide includes a waveguide core surrounded by a waveguide cladding,
   wherein each column optical waveguide includes a waveguide core surrounded by a waveguide cladding, wherein the waveguide claddings of both the row optical waveguides and the column optical waveguides are intact at one or more of the crossing sensors.

5. The optical waveguide pressure sensor of claim 1,
wherein each row optical waveguide includes a waveguide core surrounded by a waveguide cladding,
wherein each column optical waveguide includes a waveguide core surrounded by a waveguide cladding,
wherein the waveguide claddings of one or both of the row optical waveguides and the column optical waveguides are at least partially removed at one or more of the crossing sensors.

6. The optical waveguide pressure sensor of claim 1,
wherein each row optical waveguide is an optical fiber having a waveguide core surrounded by a waveguide cladding surrounded by a protective jacket,
wherein each column optical waveguide is an optical fiber having a waveguide core surrounded by a waveguide cladding surrounded by a protective jacket,
wherein the protective jackets of both the row optical waveguides and the column optical waveguides are removed at one or more of the crossing sensors.

7. The optical waveguide pressure sensor of claim 1, wherein one or more of the crossing sensors further comprise a reflector to increase optical coupling when the crossing sensor is under pressure.

8. The optical waveguide pressure sensor of claim 1, wherein one or more of the crossing sensors further comprise a scatterer to increase optical coupling when the crossing sensor is under pressure.

9. The optical waveguide pressure sensor of claim 1, wherein the row and column optical waveguides are selected from the group consisting of: step-index plastic fibers and graded-index plastic fibers.

* * * * *